Aug. 16, 1938.  A. L. MARTIN  2,127,416
LOOSE LEAF BINDING
Filed April 25, 1935

A. L. Martin
inventor
By: Glascock Downing Seebold
Attys

Patented Aug. 16, 1938

2,127,416

UNITED STATES PATENT OFFICE 2,127,416

LOOSE LEAF BINDING

André Lucien Martin, Paris, France

Application April 25, 1935, Serial No. 18,195
In France May 4, 1934

3 Claims. (Cl. 129—1)

This invention has for its object a new ring for binding loose leaves perforated with oblong slots. Such a ring comprises two parts having a width corresponding to the length of the oblong slots in the leaves, and adapted to be assembled or separated by a sliding movement parallel to the axis of the ring.

The invention still further relates to other particular points which will appear from the following description with reference to the accompanying drawing, given by way of example only, and in which.

Figure 1:
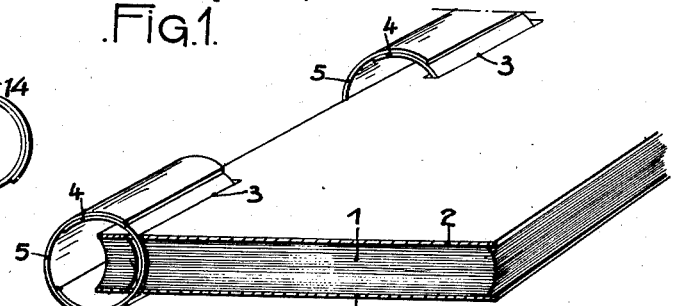
Fig. 1 is a perspective view, with partial section, of a loose leaf binding made according to the present invention.
Figure 2:
Fig. 2 is a cross section showing the two slotted rings used in the example of Fig. 1.

In the example illustrated in Figs. 1 and 2, the binding comprises loose leaves 1 and covers 2 which are provided, as well as the leaves 1, with oblong rectangular apertures or perforations 3 in which slotted rings such as 4 are engaged. These rings 4 are closed by other slotted rings 5 engaged around the first ones, preferably by resilient distortion, so that each unit, constituted by two rings 4 and 5, substantially forms a cylinder. The opening of the book can be effected, while holding the leaves flatwise, without longitudinal displacement, which inconvenience occurs when a binding with a helical thread is under consideration.

Figure 3:
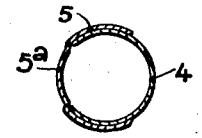
Fig. 3 is an end view of a constructional modification of two assembled slotted rings.

In order to avoid any rotary displacement of the rings 4 and 5 relatively to each other, the rings 5, as illustrated in Fig. 3, can be provided with a distorted portion 5ª.

Figure 4:
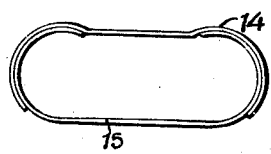
Fig. 4 is an end view of a resilient ring of oval shape.

The rings 14 and 15 might also have, as shown in Fig. 4, an oblong cross section.

In each of the examples described, the parts which constitute the ring have a circumferential development greater than the half circumferential development of the entire ring. In other words, the cross section of a part has a length from one end to the other greater than the half length of the entire ring.

It is obvious that the forms of construction described and illustrated are given herein solely by way of indication and not in a limiting sense. All modifications which do not alter in any way the main features above set forth and the desired result remain included in the scope of the present invention.

The rings can be made of metal (steel for instance) or any other material, plastic or not, without departing thereby from the scope of the invention.

What I claim as my invention and desire to secure by Letters Patent is:

1. A ring for binding loose leaves perforated with oblong slots, comprising two parts each having a width corresponding to the length of the oblong slots in the leaves and adapted to be assembled or separated by a sliding movement parallel to the axis of the ring, the edges of the said parts overlapping each other, and longitudinal stops provided on at least one of the said parts for preventing their relative rotation about the ring axis.

2. A ring for binding loose leaves perforated with oblong slots, comprising two parts each having a width corresponding to the length of the oblong slots in the leaves, each part having a middle flat portion and outer arcuated portions adapted to engage the corresponding arcuated portions of the other part by a sliding movement parallel to the axis of the ring so formed.

3. A ring for binding loose leaves perforated with oblong slots, comprising two parts each having a width corresponding to the oblong slots in the leaves and having substantially the same circumferential development greater than the half circumferential development of the entire ring, one of the said parts being adapted to enter the other by a sliding movement parallel to the axis of the ring.

ANDRÉ LUCIEN MARTIN.